US008365074B1

(12) United States Patent
Wagner et al.

(10) Patent No.: US 8,365,074 B1
(45) Date of Patent: Jan. 29, 2013

(54) NAVIGATION CONTROL FOR AN ELECTRONIC DEVICE

(75) Inventors: Mark Wagner, Clyde Hill, WA (US); Christopher D. Nesladek, San Francisco, CA (US); Jason Parekh, Snellville, GA (US)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 12/711,170

(22) Filed: Feb. 23, 2010

(51) Int. Cl.
*G06F 3/14* (2006.01)
(52) U.S. Cl. ........ 715/702; 715/718; 715/798; 715/835; 707/500.1; 345/661
(58) Field of Classification Search .......... 715/200–277, 715/700–867; 700/701–866; 709/201–229; 705/50–79; 345/30–111, 661; 348/206–231.9; 707/200–206, 500.1
See application file for complete search history.

(56) References Cited

U.S. PATENT DOCUMENTS

| 6,028,600 | A | * | 2/2000 | Rosin et al. | 715/718 |
| 7,366,995 | B2 | * | 4/2008 | Montague | 715/798 |
| 7,730,425 | B2 | * | 6/2010 | de los Reyes et al. | 715/835 |
| 2002/0032696 | A1 | * | 3/2002 | Takiguchi et al. | 707/500.1 |
| 2006/0248475 | A1 | * | 11/2006 | Abrahamsson | 715/835 |
| 2008/0204476 | A1 | * | 8/2008 | Montague | 345/661 |
| 2010/0031186 | A1 | | 2/2010 | Tseng et al. | |

* cited by examiner

*Primary Examiner* — Ruay Ho
(74) *Attorney, Agent, or Firm* — Fish & Richardson P.C.

(57) ABSTRACT

Methods, systems, and apparatus, including computer programs encoded on computer storage media, for suggesting search queries relevant to a user's context. One of the methods includes providing a navigation control for navigating in a graphical space. A portion of a large-scale graphical space is displayed on a screen of an electronic device and a navigation control is generated and displayed on the screen. The navigation control includes a ring-shaped graphical entity and a knob graphical entity positioned at point on the ring-shaped graphical entity. A zooming user input can be received to the navigation control, and in response, zooming in the graphical space is provided. The zooming user input includes the user selecting the knob graphical entity and tracing a shape of the ring-shaped graphical entity with the knob graphical entity in either a first direction to zoom in or in a second direction to zoom out.

20 Claims, 7 Drawing Sheets

NAVIGATION CONTROL FOR AN ELECTRONIC DEVICE

TECHNICAL FIELD

This document relates to user interface features for navigating information presented by an electronic device.

BACKGROUND

People spend considerable time using their electronic devices, and more particularly, their handheld electronic devices (also referred to as mobile electronic devices), such as mobile telephones, music players, PDAs (personal digital assistant) and the like. Users best like those devices that are intuitive to use and whose interactions best meet their expectations regarding how machines should operate. They interact with electronics through inputs and outputs from the devices, where the outputs generally are provided audibly and/or on a flat graphical display screen. Inputs may occur via touch screens, joysticks, mice, keypads, rollers balls and other such input mechanisms.

As electronic devices become more powerful, users interact with them more by viewing and/or interacting with graphical entities, such as maps, images, video, web pages and the like. The information represented by such entities may be enormous and very large (e.g., a detailed map of the United States can be miles wide), while the displays on electronic devices can be very small. As a result, it can be a challenge to provide graphical information in sufficient detail for a user, for example, by zooming in on one area of an entity, while still giving the user a sense of space and permitting the user to move intuitively through the space.

SUMMARY

This specification describes technologies relating to a navigational feature for a user interface. In general, one aspect, the subject matter described in this specification can be embodied in methods for providing for navigating in a graphical space. A portion of a large-scale graphical space is displayed on a screen of an electronic device and a navigation control is generated and displayed on the screen. The navigation control includes a ring-shaped graphical entity and a knob graphical entity positioned at point on the ring-shaped graphical entity. A zooming user input can be received to the navigation control from a user, and in response, zooming in the graphical space is provided. The zooming user input includes the user selecting the knob graphical entity and tracing a shape of the ring-shaped graphical entity with the knob graphical entity in either a first direction to zoom in to the graphical space or in a second direction to zoom out of the graphical space. Other embodiments of this aspect include corresponding systems, apparatus, and computer programs recorded on computer storage devices, each configured to perform the actions of the methods.

These and other embodiments can each optionally include one or more of the following features, alone or in combination. A navigational user input can be received from a user of the electronic device to navigate within the graphical space. In response to the navigational user input, the navigation control can be automatically generated and displayed. The screen can be a touch screen, and the zooming user input can include the user touching and dragging the knob graphical entity on the touch screen to trace the shape of the ring-shaped graphical entity. The zooming user input can include the a user clicking on the knob graphical entity with a mouse and moving the mouse to trace the shape of the ring-shaped graphical entity with the knob graphical entity.

A panning user input can be received to the navigation control. In response, panning can be provided in the graphical space. The panning user input can be the user selecting a region bounded by the ring-shaped graphical entity and moving the navigation control to pan across the large-scale graphical space. The screen can be a touch screen and the panning user input can be the user touching the region bounded by the ring-shaped graphical entity and dragging the navigation control across the touch screen. The panning user input can be the user clicking on the region bounded by the ring-shaped graphical entity with a mouse and moving the mouse to drag the navigation control.

The knob graphical entity can be fixed in space relative to the ring-shaped graphical entity. Tracing the shape of the ring-shaped graphical entity can rotate the ring-shaped graphical entity. In other implementations, the knob graphical entity can be constrained to move about the ring-shaped graphical entity. The ring-shaped graphical entity can remain fixed in space as the knob graphical entity is traced about the shape of the ring-shaped graphical entity.

The ring-shaped graphical entity can include a portion about the circumference of the ring configured to change in appearance to indicate a zoom level to the user. In response to the zooming input, the appearance of the portion of the ring-shaped graphical entity can dynamically change to indicate a current zoom level corresponding to the zooming input. Dynamically changing the appearance of the portion of the ring-shaped graphical entity can include changing an intensity level of a color of the portion of the ring-shaped graphical entity. A first intensity level can indicate a first zoom level and a second intensity level can indicate a second zoom level. Intensity levels in between the first and second intensity levels can indicate zoom levels in between the first and second zoom levels Particular embodiments of the subject matter described in this specification can be implemented so as to realize one or more of the following advantages. The navigation control can be operated by a user holding an electronic device in one hand. The user can easily switch between zooming and panning. The navigation control can provide visual cues to illustrate to the user the current zoom level. In implementations where the several walks around the ring are required to achieve 100% zoom, a user can achieve very precise zooming. As compared to a linear slider where the whole range of zooming is displayed and therefore limited by the width of the display, the ring can be walked any number of times before full zoom is achieved, and preciseness is not restricted by display size.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
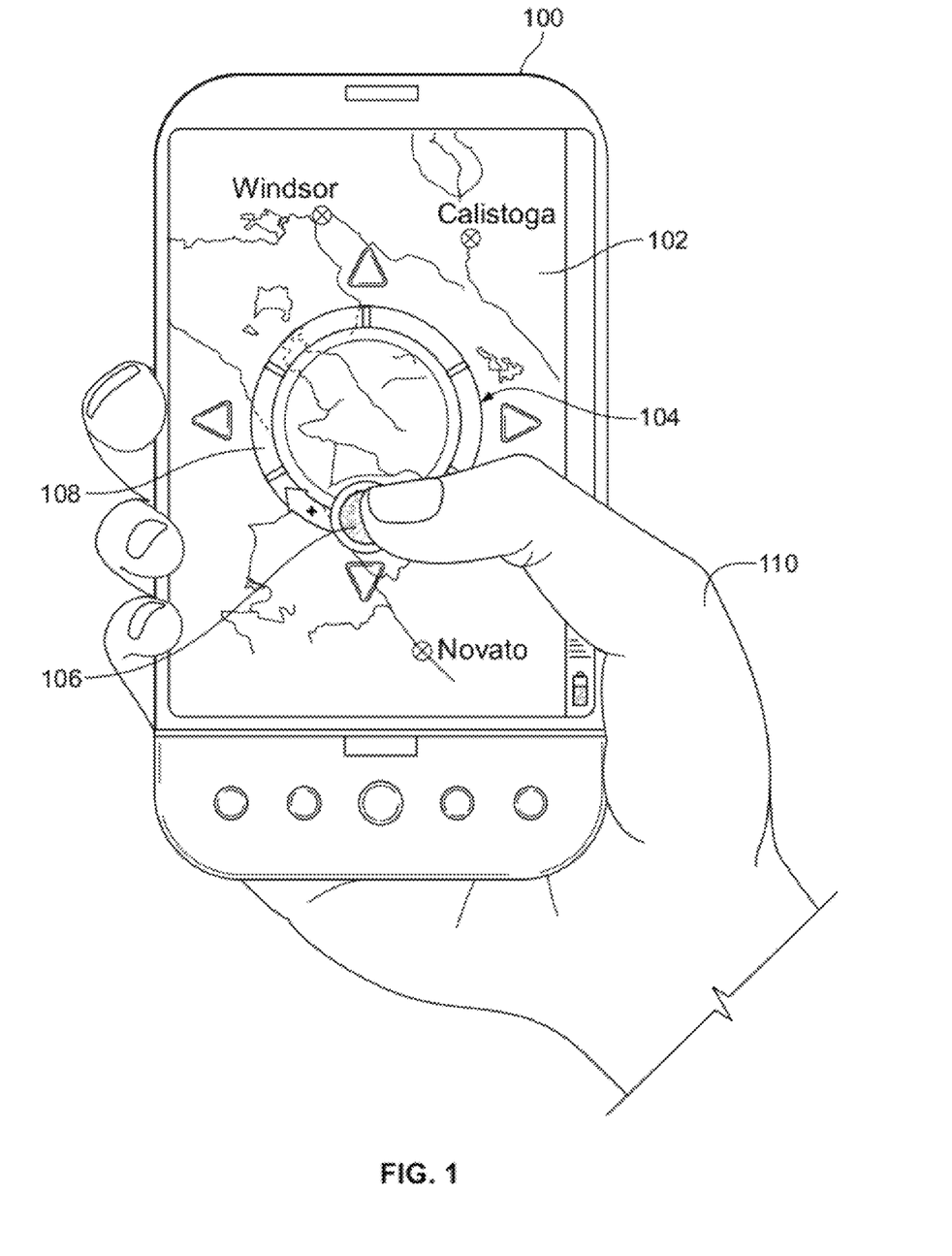
FIG. 1 is a conceptual diagram showing an example navigation control on an example electronic device.

FIG. 1 shows an example electronic device 100 having a graphical display screen 102. An example navigation control 104 for navigating a large-scale graphical space, which in this instance is a map, is displayed on the display screen 102. The large-scale graphical space is substantially larger than the area that is capable of being displayed at one time on the display screen 102. Mechanisms are discussed here that assist a user in navigating within the large-scale graphical space. By large-scale, it is meant that the graphical space is substantially larger than the display screen 102 when the graphical space is displayed at a normal zoom level, so that navigation around the space (e.g., zooming and panning) may be required.

The implementation of the navigation control 104 shown includes a knob graphical entity 106 (a "knob") and a ring-shaped graphical entity 108 (a "ring"). The knob 106 is positioned at a point on the ring 108. In the example shown, the ring 108 is circular in shape. In other implementations, the ring 108 can have a different shape, for example, an ellipse or a square with rounded corners.

In some implementations, the knob 106 is operable in manner similar to a brodie knob (also referred to as a necker knob or suicide knob) that was popular to attach to steering wheels in the 1950's, allowing for easy, one-handed rotation of the steering wheel. That is, the knob 106 can be selected and moved by a user to trace the shape of the ring and thereby rotate the ring 108, which is fixed in space relative to the knob 106. Rotating the ring 108 affects the zoom level of the information being presented on the display screen 102. For example, turning the ring 108 clockwise can increase the zoom level and turning the ring 108 counter-clockwise can decrease the zoom level.

In other implementations, the knob 106 is not fixed in space relative to the ring 108, but rather is constrained to move about the ring 108, as the ring 108 remains in a fixed position. That is, the knob 106 can be selected and moved by a user to trace the shape of the ring 108, where the ring itself does not move. Moving the knob 106 about the ring 108 affects the zoom level of the information being presented on the display screen 102. For example, moving the knob 106 clockwise can increase the zoom level, and turning the knob 106 counter-clockwise can decrease the zoom level.

In the example shown, the electronic device 100 is a handheld device, e.g., a mobile telephone, and the display screen 102 is a touch screen. As shown, the user can hold the electronic device 100 in one hand and use their thumb to touch the knob 106 and trace the shape of the ring 108, either to rotate the ring 108 or to move the knob 106 about the ring 108. The user can thereby easily navigate within the large-scale graphical space with one finger, e.g., their thumb 110. In addition, the item that is used to contact the knob 106 can trace the shape of the ring in a substantial manner, so that a user can effect zooming without needing to trace exactly on top of the ring.

Figure 2A:
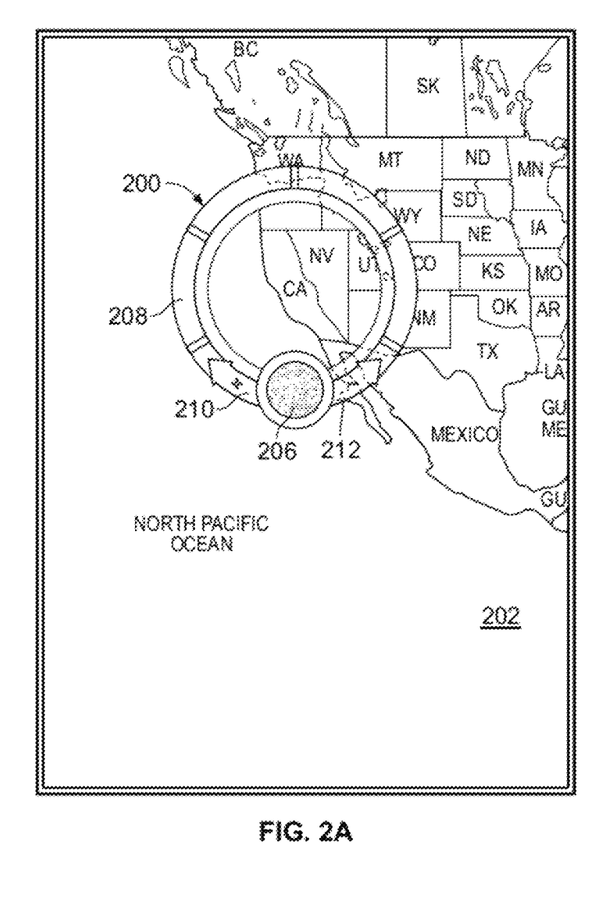
FIGS. 2A-C show example screen shots from the display of an electronic device.
Figure 2B:
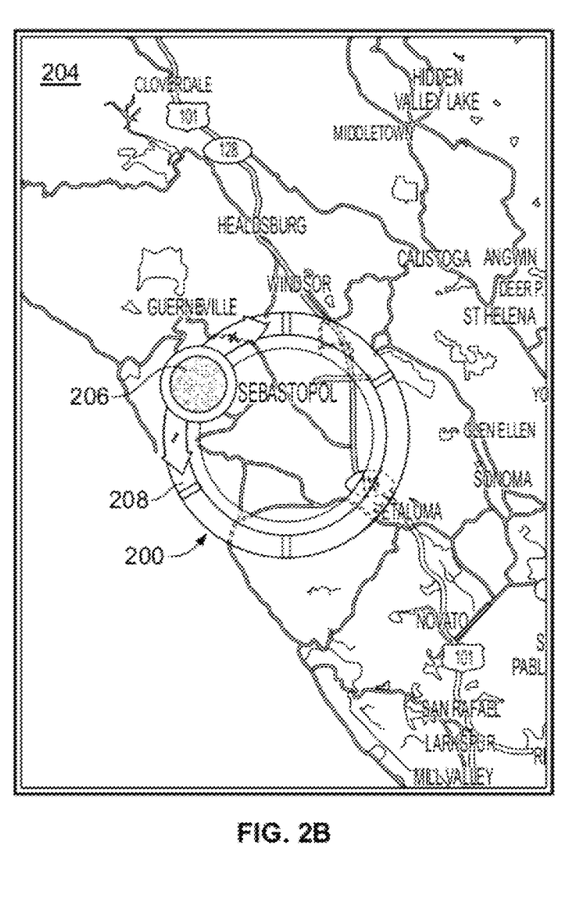
Figure 2C:
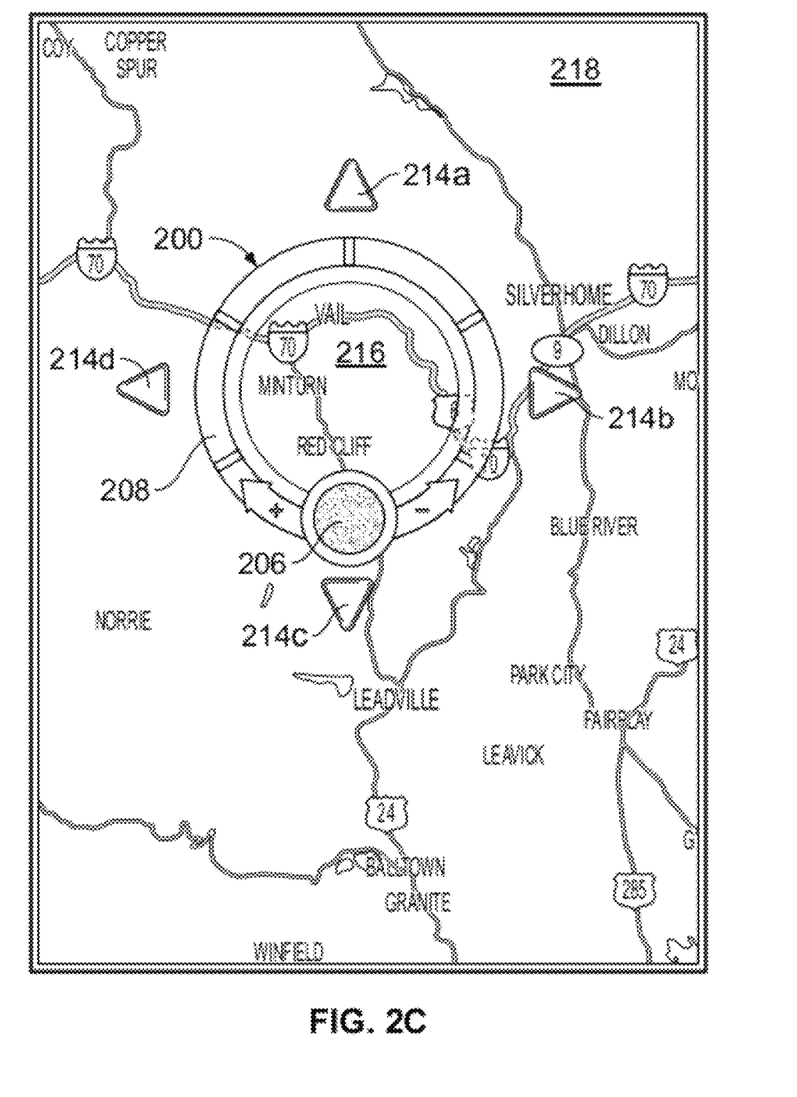

Referring now to FIGS. 2A-C, a series of screen shots are shown to illustrate example zooming and panning features of the navigation control, where each screen shot represents a display on an electronic device, e.g., the electronic device 100. FIG. 2A shows a navigation control 200 that overlays a portion of a large-scale graphical space. In this example, the large-scale graphical space is a map of the world and is at least multiples larger than the area of the display screen. The navigation control 200 includes a knob 206 positioned on a ring 208. Moving the knob 206 causes the ring 208 to rotate. For example, if the display screen is a touch screen, a user can touch the knob 206 and while touching the knob 206, trace the shape of the ring 208, causing the ring 208 to rotate. In another example, a user can use a mouse to select the knob 206 and drag the knob 206 to trace the shape of the ring 208, again causing the ring 208 to rotate.

The navigation control 200 shown is at least partially transparent, so as not to obscure the information presented on the display beneath the navigation control 200. For illustrative purposes, the graphical elements positioned directly beneath the ring 208 and knob 206 are drawn in phantom, to show that they are still visible to the user, although they appear layered beneath the partially transparent navigation control 200. In other implementations, the navigation control 200 can be opaque or substantially opaque, or alternatively, substantially transparent.

In the implementation shown, a zoom direction indicator includes a "+" arrow 210 and a "−" arrow 212, to indicate to the user in which direction to move the knob 206 to either increase the zoom level (i.e., "+") to zoom in, or decrease the zoom level (i.e., "−") to zoom out. Preferably, as shown in this example, the navigation control 200 is displayed with some level of transparency, such that the information displayed beneath the navigation control 200 can still be viewed by the user and the navigation control 200 does not obstruct the user's view of the information being presented.

Referring now to FIG. 2B, a screen shot at a later point in time is shown. At this point, the user has moved the knob 206 clockwise, thereby rotating the ring 208 clockwise to some degree. The clockwise movement has increased the zoom level. The increased zoom level is illustrated by the zoomed in view of the area of the map 204 that is shown beneath the navigation control 200 in FIG. 2A. At the earlier point in time (i.e., in FIG. 2A), the navigation control 200 was positioned over top of the state of California. After adjusting the zoom level, a close-up view of a portion of the state of California is now displayed to the user in FIG. 2B. The user can continue to zoom in closer if a more detailed view of a particular area of the map is desired. For example, if the user would like to view a map of the town of Sebastopol, which is shown beneath the navigation control in FIG. 2B, the user can continue to move the knob 206 in a clockwise direction.

Referring now to FIG. 2C, a panning feature of the navigation control 200 is illustrated. The user may desire to view a different portion 218 of the large-scale graphical space, other than what is presented at a current time on their display screen. The user can drag the navigation control 200 in a direction in the large-scale graphical space in which they would like to traverse, and the portion of the large-scale graphical space displayed to them changes correspondingly. In some implementations, as shown, arrows 214a, b, c and d can be included in the navigation control 200 once the panning feature is activated, to indicate that panning is an active input and to indicate the panning directions to the user.

Various user inputs can be used to activate the panning feature. In some implementations, the user can select the region bounded by the ring 208, i.e., region 216, and then drag the navigation control 200 in the desired direction. In implementations where the display screen is a touch screen, the user can select the region 216 by touching the region 216. In other implementations, a different user input mechanism can be used to select the region 216, for example, clicking on the region with a mouse, although other mechanisms are also possible.

Dragging the navigation control 200 in a certain direction can make it appear to the user that they are navigating over the large-scale graphical space. In actuality, the portion of the large-scale graphical space presented on the display screen to the user changes in response to the direction in which the navigation control 200 is dragged. For example, if the user drags the navigation control 200 toward the right, i.e., due east, the portion of the map presented on the display screen dynamically changes to show areas of the map to the east of the area previously presented. As shown in FIG. 2C, the user has panned east of California and a portion of the map representing the state of Colorado is now presented on the display screen.

If the user has panned to a portion of the large-scale graphical space where they would now like to either zoom in or zoom out, they can deactivate the panning feature. For example, if the user activated the panning feature by touching and dragging the region 216, the user can lift their finger from the touch screen to deactivate the panning feature. The user can then use the knob 206 to adjust the zoom level to either zoom in or zoom out of the area of the map presented on the display screen.

The user may also institute panning by dragging on the ring 208 in a direction that is orthogonal to the arc that makes up the ring 208. For instance, if a user wanted to pan to the Southwest on a map, the user could touch the lower left area of the ring 208, and then drag to the Southwest. Because such a motion is plainly not around the circumference of the ring 208, the system could readily interpret it as a different form of intended input.

In some implementations, the navigation control 200 can be generated and displayed as a pop-up control in response to a user input requesting to activate the control. As an example, and without limitation, in implementations where the display screen is a touch screen, the user can double-tap on the screen to activate the navigation control 200. In response to the user's double-tap, the navigation control 200 is automatically generated and displayed on the display screen. As another example, an icon can be presented on the display screen that represents the navigation control 200. The user can select the icon, for example, by touching the icon or clicking on the icon with a mouse, to activate the navigation control. In response to the user input, the navigation control is automatically generated and displayed.

In some implementations, the user can deactivate the navigation control 200 thereby causing it to disappear from display on the display screen. As one example, and without limitation, the user can double-tap on the navigation control 200 or elsewhere on the touch screen to dismiss the control 200. In another example, after a predetermined period of inactivity of the navigation control 200, the control 200 can "time-out" and automatically be dismissed.

The area bounded by the ring 208 may also provide a preview of the action that is being performed by the user. For example, the area of a map inside the ring 208 may be displayed at the next zoom level that will be achieved if the user keeps zooming, whereas the area outside the ring may be shown at the current zoom level. Because the use of the ring zooming control prevents the user's finger from covering the center of zooming that is set at the center of the ring 208, the user can thus see the particular point on which they are zooming and quickly determine whether they want to go to the next level, or instead stop at the level they are currently at.

Figure 3A:
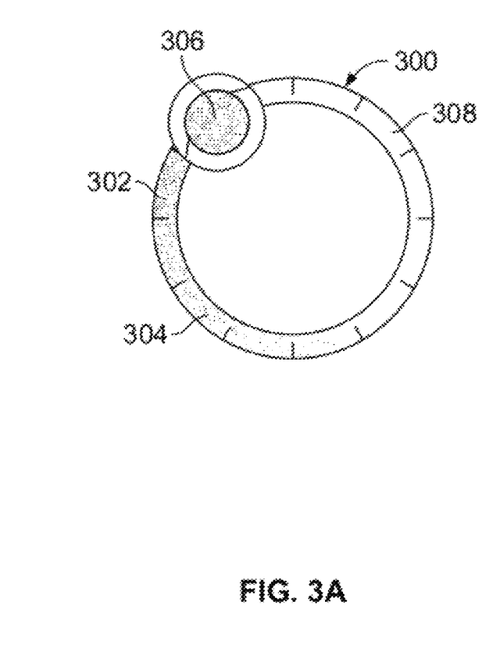
FIGS. 3A-C show example navigation controls.
Figure 3B:
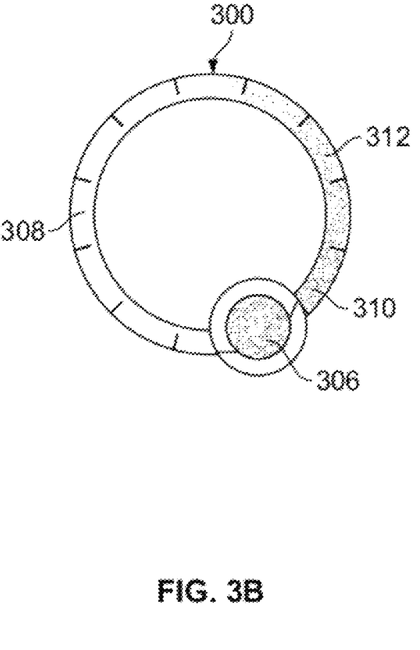

Referring now to FIGS. 3A and 3B, another example navigation control 300 is shown, that includes a knob 306 and a ring 308. In some implementations, the navigation control 300 can include a zoom level indicator, so that a user is aware of the current level of zoom. In the example shown, the zoom level indicator is embodied as a dynamically changing appearance of a portion of the navigation control 300. The ring 308, or some portion thereof, dynamically changes appearance as the zoom level changes, for example, by changing in color (e.g., providing a contrasting color), which is represented in the drawing as a shaded region. In the implementation shown, the shading (or contrasting color) is more intense in a region closer to the knob 306, i.e., region 302, and less intense further away from the knob 306, i.e., region 304.

Referring to FIG. 3A, the navigation control 300 is shown at a first zoom level and referring to FIG. 3B, the navigation control 300 is shown at a second zoom level. As the user moves the knob 306 to trace the shape of the ring 308, the color of that portion of the ring that has been traced changes, visually tracking the user's movements. In other implementations, the ring 308 can initially be presented as substantially transparent, and as the user moves the knob 306 to trace the shape of the ring 308, the ring's appearance can change to less transparent or opaque to visually display the path of the knob 306, which represents the zoom level indicator. In some implementations, an intensity level of the color of the ring 308 can vary with the zoom level, thereby providing a zoom level indicator. That is, as the zoom level increases, the intensity of the color can increase (as in region 310), or in another alternative can decrease (as in region 312). For example, the closer the user gets to the end of zoom, the more fuller or richer in saturation the appearance of the ring 308.

Figure 3C:
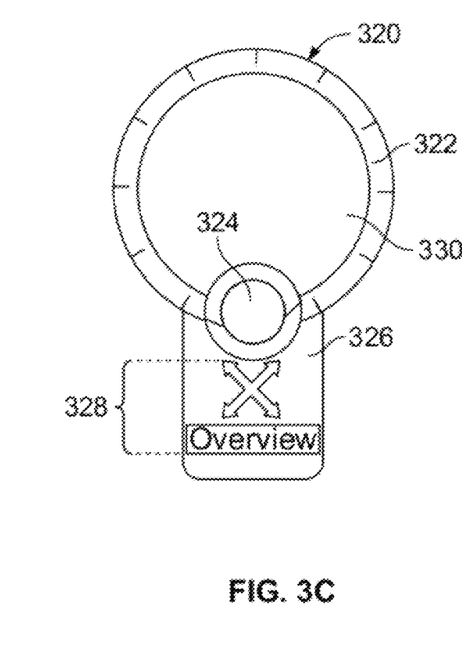

Referring to FIG. 3C, in some implementations a navigation control 320 having a ring 322 and knob 324 can be presented to a user together with another navigation tool. In the example shown, an "overview" navigation tool is represented by an icon 328 presented on a tab 326 extending from the navigation control 320. In response to the user indicating a desire to navigate within a large-scale graphical space, for example, by double-tapping a touch screen display, the navigation control 320 and tab 326 can be automatically generated and displayed on the screen. The user can then choose which tool to use to navigate with the large-scale graphical space.

The user can choose to use the navigation control 320 by either selecting and moving the knob 324 to request a zoom in or out, or by selecting the region 330 bounded by the ring 322, to pan about the graphical space. Optionally, if the navigation control 320 is selected, the tab 326 including the icon 328 can disappear. Alternatively, the user can select the overview icon 328 to indicate a desire to navigate within the space using the overview navigation tool. In that case, the navigation control 320 (i.e., the ring 322 and knob 324) can be dismissed, and the overview navigation tool can take over providing zooming and panning operations.

The second navigation tool, i.e., the overview tool, is just one illustrative example. If a particular application, e.g., a browser application, has a different alternative navigation tool available, then an icon for that different alternative navigation tool can be shown on the tab 326, or otherwise displayed in conjunction with the navigation control 320, and the user can thereby select which tool to use.

The overview tool shown in this example can operate as follows. In response to the user selecting to use the overview tool, a magnifying zoom box can be automatically generated and displayed overlaying the portion of the large-scale graphical space shown in the display screen. The user can press on the box and drag it around until it lies over an area the user would like to view more closely. Once the user has moved the zoom box over this area, the user can lift his/her finger to leave the zoom box in the location they would like to view more closely. This action can cause the area within the zoom box to automatically be zoomed in on to fill the entire display (or at least a larger portion thereof). The user can pan on the space by dragging their finger on the screen (or rolling a trackball, or otherwise) and can choose to zoom back out again, e.g., by double-tapping on the screen. As mentioned above, the overview tool is but one example of an alternative navigation tool that can be presented to a user in conjunction with the navigation control 320. It should also be noted that in other implementations, the overview tool can operate differently than described above.

Though not shown in the figures, the pressure with which a user presses on a screen may affect the manner in which panning or zooming occurs. For example, if a user presses lightly while tracing their finger around a zooming ring, the zooming that occurs may be relatively minor for each set distance traced out by the user, whereas if the pressure is higher, the zooming may be greater. In this manner, a user may conveniently zoom quickly to approximately the level they desire, and as they approach the desired level, they may let up their pressure and obtain more-fine tuned control at the end of their zooming cycle. In a similar manner, relative pressure on a screen may be used to set a rate of panning for a user.

In some implementations, the user can trace their finger around the zooming ring with the knob once to go from the lowest level of zoom to the highest level of zoom. In other implementations, the user can trace their finger around the ring multiple times before reaching the highest level of zoom. Each time a user traces the ring a full circle can be referred to as a "walk" around the ring. In one example, the user can walk around the ring once to achieve a 20% zoom level and therefore walk the ring a total of five times to achieve a 100% zoom level. That is, the zoom range in this example is five walks around the ring. In applications with large zoom capability, for example a mapping application, the user can thereby achieve very precise zooming.

Figure 4:
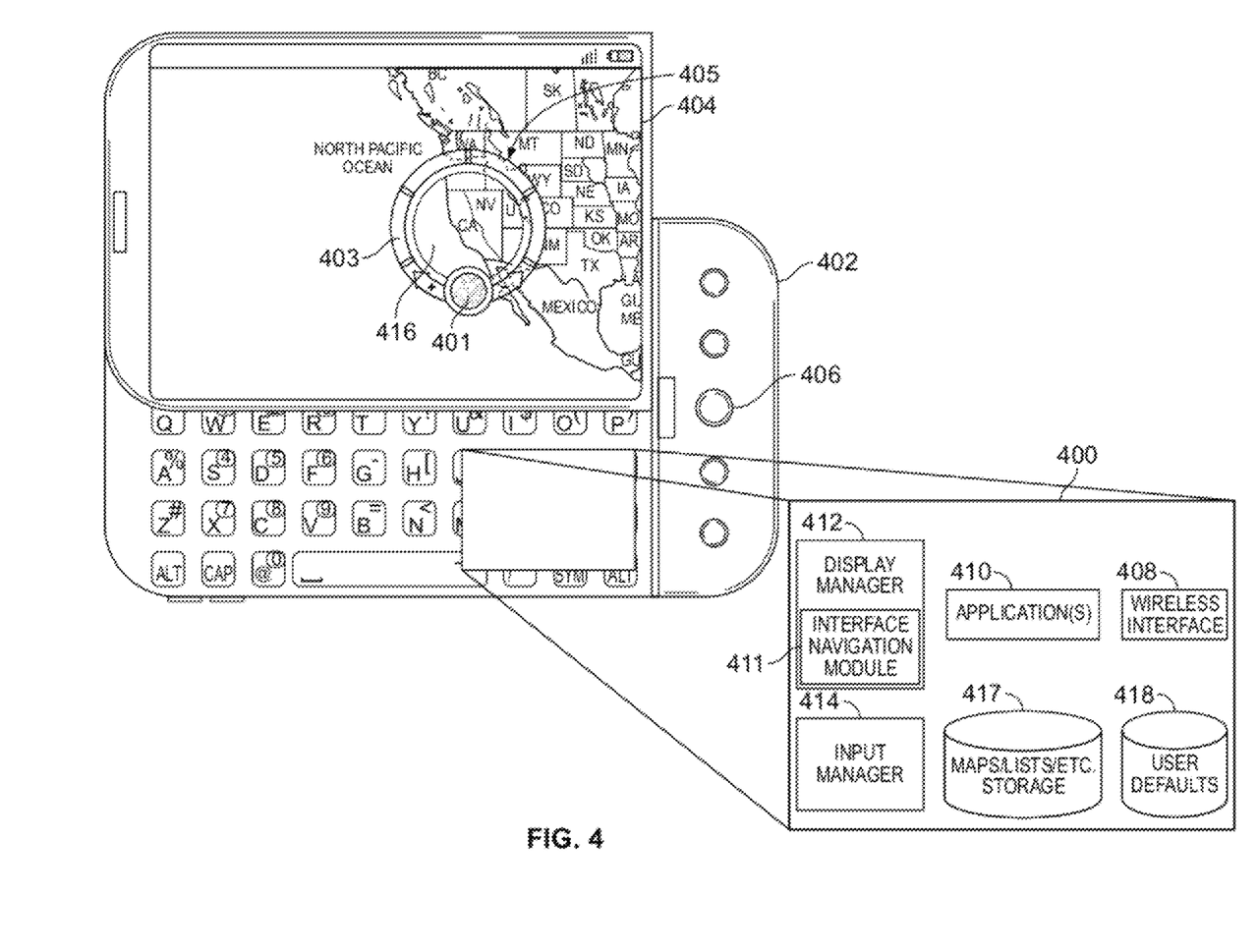
FIG. 4 is a schematic representation of an example system including the navigation control shown in FIG. 1.

FIG. 4 is a schematic diagram of an example system 400 that provides user interaction in response to touch screen inputs. The system 400 may be implemented using a mobile electronic device such as device 402. The device 402 includes various input and output mechanisms such as a touch screen display 404 and a roller ball 406. A number of components within device 402 may be configured to provide various selection functionality on display 404, such as navigation within large-scale graphical spaces which exceed the size of the display 404, as described above.

One such component is a display manager 412, which can be responsible for rendering content for presentation on display 404. The display manager 412 can receive graphic-related content from a number of sources and can determine how the content is to be provided to a user. For example, a number of different windows for various applications 410 on the device 404 may need to be displayed, and the display manager 412 may determine which to display, which to hide, and what to display or hide when there is overlap between various graphical objects.

The display manager 412 can include various components to provide the device 402 with particular functionality for interacting with displayed components, which may be shared across multiple applications, and may be supplied, for example, by an operating system of device 402. Such functionality may be provided, for example, by interface navigation module 411, which may be responsible for receiving input from a user wanting to move between and among elements on display 404. In this example, a navigation control 405 is shown on display 404, and may be similar to the navigation control 200 in FIGS. 2A-C.

If the user selects to activate the navigation control 405, for example, by double-tapping on the display 404, interface navigation module 411 can automatically generate and display the navigation control 405. If the user activates a panning feature, for example, by touching the region 416 bounded by the navigation control 405, and drags the control 405, the interface navigation module 411 can cause the map to pan an amount related to the dragging motion. If the user activates a zooming feature, for example, by touching the knob 401 and moving the knob 401 to trace the shape of the ring 403, the interface navigation module 411 can cause the map to zoom an amount related to the tracing motion. Interface navigation module 411 can likewise provide for other changes in the display 404 in response to user input, such as those described above and below.

Individual applications 410 can register themselves with the display manager 412 in accordance with an API so as to indicate the sort of display elements they might require. An input manager 414 may be responsible for translating commands provided by a user of device 402. For example, such commands may come from a keyboard, from touch screen display 404, from roller ball 406, or from other such sources, including dedicated buttons or soft buttons (e.g., buttons whose functions may change over time, and whose functions may be displayed on areas of display 404 that are adjacent to the particular buttons). The input manager 414 may determine, for example, in what area of the display commands are being received, and thus in what application being shown on the display the commands are intended for. In addition, it may interpret input motions on the touch screen 404 into a common format and pass those interpreted motions (e.g., short press, long press, flicks, and straight-line drags) to the appropriate application. The input manager 414 may also report such inputs to an event manager (not shown) that in turn reports them to the appropriate modules or applications.

A variety of applications 410 may operate, generally on a common microprocessor, on the device 402. The applications 410 may take a variety of forms, such as mapping applications, e-mail and other messaging applications, web browser applications, digital photo viewing and/or editing applications, gallery applications, music and video players, and various applications running within a web browser or running extensions of a web browser.

A wireless interface 408 manages communication with a wireless network, which may be a data network that also carries voice communications. The wireless interface may operate in a familiar manner, such as according to the examples discussed below, and may provide for communication by the device 402 with messaging services such as text messaging, e-mail, and telephone voice mail messaging. In addition, the wireless interface 408 may support downloads and uploads of content and computer code over a wireless network.

Various forms of persistent storage may be provided, such as using fixed disk drives and/or solid state memory devices. Two examples are shown here. First, maps/lists/etc storage 417 includes all sorts of data to be used by applications 410, and can include lists of data elements, graphical components like map tiles, and a variety of other well known data structures so that a user can interact with applications on device 402.

Other storage includes user defaults 418, which may be profile information for a user stored on the same media as maps/links/etc. storage 417. The user defaults 418 include various parameters about a user of the device 402. In the example relevant here, the user profile may include data defining the manner in which the user prefers to have panning controls presented on the display 404 (e.g., what the controls should look like, whether a list should scroll with the control or in the opposite direction of the control, the actions by the user that will bring up the control, etc.).

Using the pictured components, and others that are omitted here for clarity, the device 402 may provide particular actions in response to user inputs. Specifically, the device 402 may respond to zooming and panning inputs within a large-scale graphical space in particular ways, including by displaying a navigation control that permits zooming and panning in the space.

Figure 5:
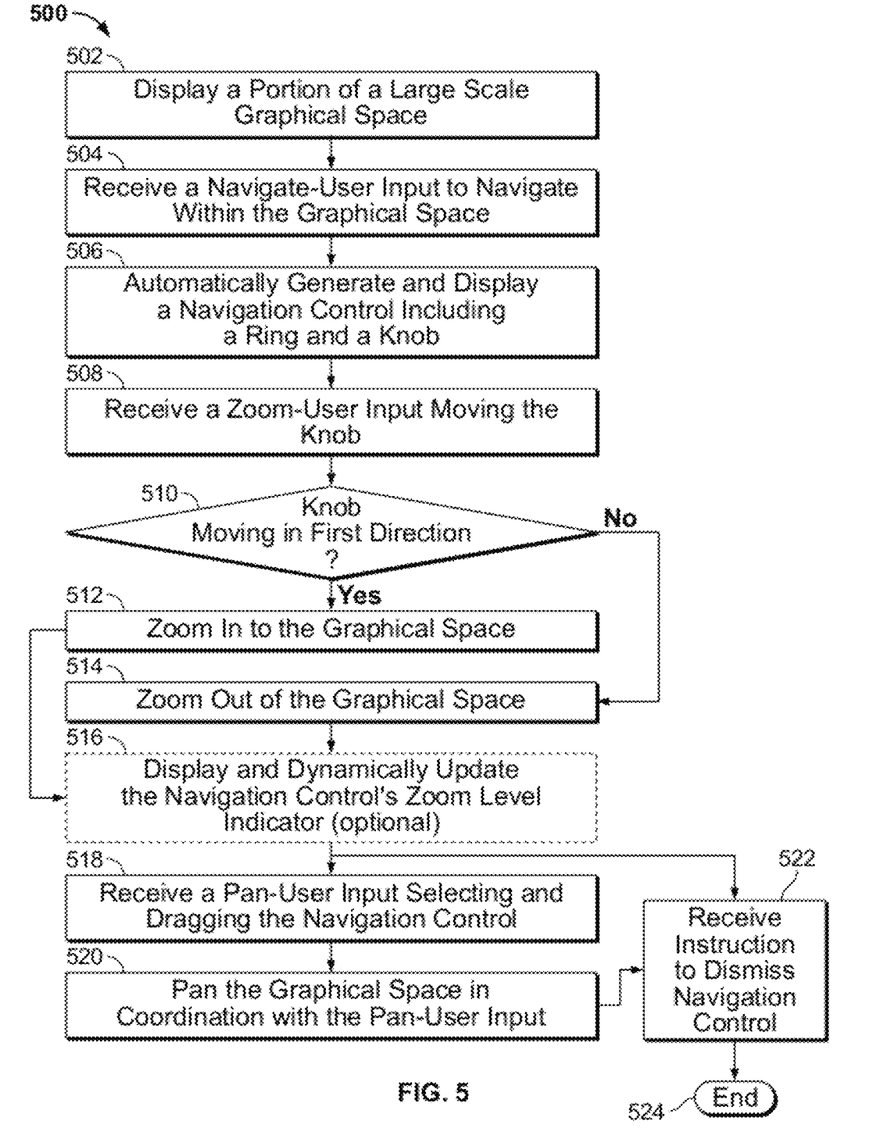
FIG. 5 is a flowchart showing an example method for using a navigation control.

FIG. 5 is a flowchart showing an example process 500 for navigating within a large-scale graphical space. The process 500 can be implemented using a control similar to the navigation controls 100, 200 and 300 shown in FIGS. 1 to 3C, discussed above, although other forms of control can be used. For illustrative purposes, and without limitation, the process 500 shall be described in reference to the navigation control 200 shown in FIGS. 2A-C.

A portion of the large-scale graphical space is displayed (Step 502). For example, as shown in FIG. 2A, if the large-scale graphical space represents a map of the world, a portion 202 of the map, e.g., the western United States, can be displayed on a display screen.

A navigate-user input is received to navigate within the large-scale graphical space (Step 504). For example, if the display screen is a touch screen, a user can double-tap the touch screen to activate a navigation control such as control 200, where the double-tap is the navigate-user input.

In response to the navigate-user input, a pop-up navigation control can be automatically generated and displayed (Step 506), the navigation control including a knob positioned at a point on a ring. For example, the navigation control 200 can be automatically displayed overlaying the portion of the map displayed to the user, as shown in FIG. 2A.

A zoom-user input is received moving the knob to trace the shape of the ring (Step 508). For example, in some implementations the knob is moved to rotate the ring, where the movement is the zoom-user input. In other implementations, the knob is moved along a path constrained by the ring. FIG. 2B shows the navigation control 200 after the knob has moved in a clockwise direction in response to a zoom-user input.

Moving the knob in a first direction, e.g., clockwise, can indicate the user's desire to zoom in to the graphical space, as compared to moving the knob in a second direction, e.g., counter-clockwise, which can indicate the user's desire to zoom out of the graphical space. A determination is made as to whether the knob was moved in the first direction (Step 510). For example, as shown in FIGS. 2A and 2B, the knob was moved in a clockwise direction, causing a zooming in effect on the map presented.

If the knob was moved in the first direction, e.g., clockwise ("Yes" branch of decision step 510), then the portion of the graphical space presented on the display screen is zoomed in an amount corresponding to the movement of the knob (Step 512). For example, as shown in FIG. 2B, the portion 204 of the map presented has zoomed in from a map of the western United States to a map of a portion of California.

If the knob is moved in the second direction, e.g., counter-clockwise ("No" branch of decision step 510), then the portion the graphical space presented on the display screen is zoomed out in an amount corresponding to the movement of the knob (Step 514). For example, if the user viewing the screen shot shown in FIG. 2B then moved the knob counter-clockwise a certain amount, then the map zooms out and the user can be presented with the portion of map shown in FIG. 2A, or otherwise, depending on the amount of zooming out requested.

Optionally, the navigation control can include a zoom level indicator that can be displayed and dynamically updated in response to the zoom-user input (Step 516). For example, referring to FIGS. 3A and 3B, a zoom level can be indicated by a dynamic change in appearance of the ring 308 (or a portion of the ring 308), as the knob 306 is moved in a path tracing the shape of the ring 308, to visually show the path of the knob 306.

A pan-user input can be received indicating a user's desire to pan within the large-scale graphical space (Step 518). For example, referring to FIG. 2C, a user can select (e.g., by touching) the region 216 bounded by the ring 208 and drag the navigation control 200 in a direction. The portion of the large-scale graphical space displayed can dynamically change to show portions of the graphical space in the direction corresponding to the direction in which the navigation control is being dragged (Step 520). The user can then stop panning when a desired portion of the large-scale graphical space is displayed and optionally activate the zoom feature to either zoom in or zoom out of the graphical space.

Either before or after receiving a pan-user input, an instruction can be received to dismiss the navigation control (Step 522) and the process can end (Termination 524). For example, the user can dismiss the navigation control, e.g., by double-tapping the screen, or the navigation control can "time-out" after a predetermined period of inactivity has elapsed.

In the various examples discussed above, the large-scale graphical space represented a map which can be obtained, for example, from a map application. However, it should be understood that the systems and techniques for navigating a large-scale graphical space described herein can be applied to other types of graphical spaces. For example, the graphical space can represent a webpage in a web browser and a user can use the navigation control and process described to zoom in and out of portions of the webpage and to pan across the webpage. In another example, the graphical space can represent a digital image and the user can user the navigation control and process described to zoom in and out of portions of the image and to pan the image. In yet another example, the graphical space can represent a document, e.g., a document in a word processing application or a document in a PDF format. The user can zoom in and out of portions of the document and pan the document using the navigation control and process described. Other types of graphical spaces are possible, and the ones described above are but a few examples.

Figure 6:
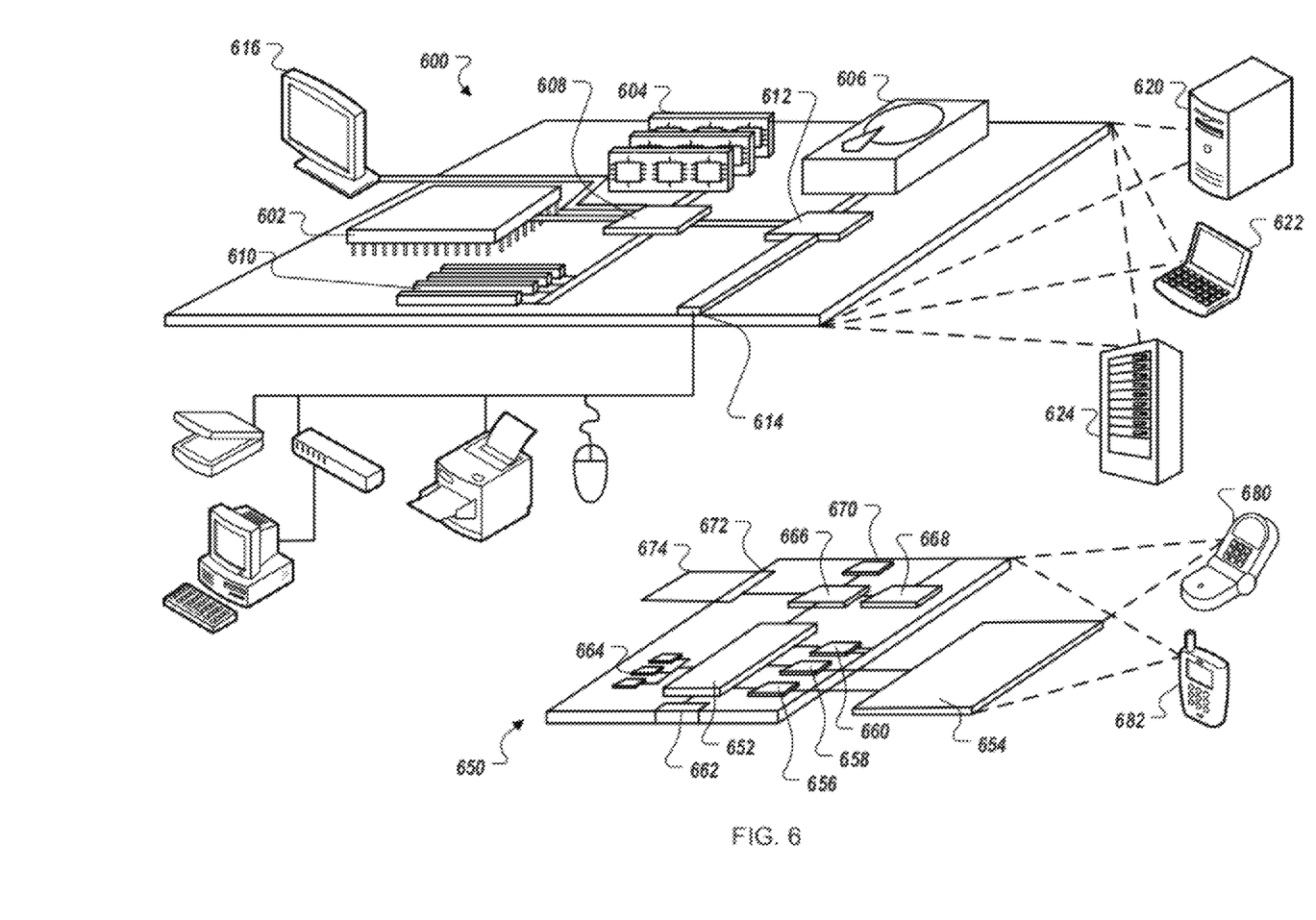
FIG. 6 shows examples of generic computer devices that may be used to execute the actions discussed in this document.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile electronic devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer-readable or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for instance, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user-interface method comprising:
    outputting, for display on a screen of an electronic device, a portion of a large-scale graphical space;
    generating and outputting, for display on the screen, a navigation control that includes a ring-shaped graphical entity and a knob graphical entity positioned at a point on the ring-shaped graphical entity, wherein the knob graphical entity is fixed in space relative to the ring-shaped graphical entity; and
    receiving, from a user, a zooming user input to the navigation control, and in response, providing zooming in the graphical space,
    wherein the zooming user input comprises the user selecting the knob graphical entity and tracing a shape of the ring-shaped graphical entity with the knob graphical entity in either a first direction to zoom in to the graphical space or in a second direction to zoom out of the graphical space, wherein tracing the shape of the ring-shaped graphical entity rotates the ring-shaped graphical entity.

2. The method of claim 1, further comprising:
    receiving a navigational user input from a user of the electronic device to navigate within the graphical space; and
    in response to the navigational user input, automatically generating and displaying the navigation control.

3. The method of claim 1, wherein the screen comprises a touch screen, and the zooming user input comprises the user touching and dragging the knob graphical entity on the touch screen to trace the shape of the ring-shaped graphical entity.

4. The method of claim 1, wherein the zooming user input comprises a user clicking on the knob graphical entity with a mouse and moving the mouse to trace the shape of the ring-shaped graphical entity with the knob graphical entity.

5. The method of claim 1, further comprising:

receiving a panning user input to the navigation control and, in response, providing panning in the graphical space, wherein the panning user input comprises the user selecting a region bounded by the ring-shaped graphical entity and moving the navigation control to pan across the large-scale graphical space.

6. The method of claim 5, wherein the screen is a touch screen and the panning user input comprises the user touching the region bounded by the ring-shaped graphical entity and dragging the navigation control across the touch screen.

7. The method of claim 5, wherein the panning user input comprises a user clicking on the region bounded by the ring-shaped graphical entity with a mouse and moving the mouse to drag the navigation control.

8. The method of claim 1, wherein the ring-shaped graphical entity includes a portion about the circumference of the ring configured to change in appearance to indicate a zoom level to the user, the method further comprising:

in response to the zooming input, dynamically changing the appearance of the portion of the ring-shaped graphical entity to indicate a current zoom level corresponding to the zooming input.

9. The method of claim 8, wherein dynamically changing the appearance of the portion of the ring-shaped graphical entity comprising changing an intensity level of a color of the portion of the ring-shaped graphical entity, where a first intensity level indicates a first zoom level and a second intensity level indicates a second zoom level and intensity levels in between the first and second intensity levels indicate zoom levels in between the first and second zoom levels.

10. The method of claim 1, wherein user input tracing the shape of the ring-shaped graphical entity around the entire shape once provides partial zooming and user input tracing the shape of the ring-shaped graphical entity around the entire shape a plurality of times provides full zooming.

11. A computer-implemented user-interface method comprising:

displaying on a screen of an electronic device a portion of a large-scale graphical space;

generating and displaying on the screen a navigation control that includes a ring-shaped graphical entity and a knob graphical entity positioned at a point on the ring-shaped graphical entity, wherein the knob graphical entity is fixed in space relative to the ring-shaped graphical entity; and receiving a zooming user input to the navigation control from a user, and in response, providing zooming in the graphical space, wherein the zooming user input comprises the user selecting the knob graphical entity and tracing a shape of the ring-shaped graphical entity with the knob graphical entity in either a first direction to zoom in to the graphical space or in a second direction to zoom out of the graphical space, wherein tracing the shape of the ring-shaped graphical entity rotates the ring-shaped graphical entity.

12. A computer readable storage device encoded with a computer program, the computer program comprising instructions operable, when executed by one or more processors, to perform operations comprising:

outputting, for display on a screen of an electronic device, a portion of a large-scale graphical space;

generating and outputting, for display on the screen, a navigation control that includes a ring-shaped graphical entity and a knob graphical entity positioned at a point on the ring-shaped graphical entity, wherein the knob graphical entity is fixed in space relative to the ring-shaped graphical entity; and receiving, from a user, a zooming user input to the navigation control, and in response, providing zooming in the graphical space, wherein the zooming user input comprises the user selecting the knob graphical entity and tracing a shape of the ring-shaped graphical entity with the knob graphical entity in either a first direction to zoom in to the graphical space or in a second direction to zoom out of the graphical space, wherein tracing the shape of the ring-shaped graphical entity rotates the ring-shaped graphical entity.

13. The computer-readable storage device of claim 12, the instructions further operable, when executed, to perform operations comprising:

receiving a navigating user input from a user of the electronic device to navigate within the graphical space; and in response to the navigating user input, automatically generating and displaying the navigation control.

14. The computer-readable storage device of claim 12, the instructions further operable, when executed, to perform operations comprising:

receiving a panning user input to the navigation control and, in response, providing panning in the graphical space, wherein the pan-user input comprises the user selecting a region bounded by the ring-shaped graphical entity and moving the navigation control to pan across the large-scale graphical space.

15. The computer-readable storage device of claim 12, wherein the ring-shaped graphical entity includes a portion about the circumference of the ring configured to change in appearance to indicate a zoom level to the user, the product further comprising instructions operable to cause the one or more programmable processors to perform operations comprising:

in response to the zooming user input, dynamically changing the appearance of the portion of the ring-shaped graphical entity to indicate a current zoom level corresponding to the zooming input.

16. The computer-readable storage device of claim 12, wherein user input tracing the shape of the ring-shaped graphical entity around the entire shape once provides partial zooming and user input tracing the shape of the ring-shaped graphical entity around the entire shape a plurality of times provides full zooming.

17. A computer-implemented user interface system, comprising:

a graphical display to output for display portions of large-scale graphical areas;

means for generating and outputting, for display on the graphical display, a navigation control that includes a ring-shaped graphical entity and a knob graphical entity positioned at a point on the ring-shaped graphical entity, wherein the knob graphical entity is fixed in space relative to the ring-shaped graphical entity;

the navigation control operable to receive user selections in coordination with the display of the portions of the large-scale graphical areas; and means for zooming in to the large-scale graphical areas in response to a user selection moving the knob graphical entity to trace a shape of the ring-shaped graphical entity in a first direction and zooming out of the large-scale graphical areas in response to a user selection moving the knob graphical entity to trace the shape of the ring-shaped graphical entity in an opposite second direction, wherein moving the knob graphical entity to trace the shape of the ring-shaped graphical entity rotates the ring-shaped graphical entity.

18. The system of claim 17, further including a:

means for providing panning in the large-scale graphical areas in response to a user selection of a region bounded by the ring-shaped graphical entity and the user moving the navigation control to pan across the large-scale graphical areas.

19. The system of claim 17, wherein the graphical display comprises a touch screen and user selections comprise the user touching the touch screen.

20. The system of claim 17, wherein user input tracing the shape of the ring-shaped graphical entity around the entire shape once provides partial zooming and user input tracing the shape of the ring-shaped graphical entity around the entire shape a plurality of times provides full zooming.

\* \* \* \* \*